(12) United States Patent
Dickens et al.

(10) Patent No.: US 7,949,789 B2
(45) Date of Patent: May 24, 2011

(54) DISTANCE EXTENDER FOR SERIAL ATTACHED SCSI AND SERIAL ATA

(75) Inventors: Louie Arthur Dickens, Tucson, AZ (US); Timothy A. Johnson, Tucson, AZ (US); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 12/054,843

(22) Filed: Mar. 25, 2008

(65) Prior Publication Data
US 2009/0248884 A1 Oct. 1, 2009

(51) Int. Cl.
*G06F 15/16* (2006.01)
(52) U.S. Cl. ........................................ 709/246; 370/466
(58) Field of Classification Search .................. None
See application file for complete search history.

(56) References Cited

U.S. PATENT DOCUMENTS

| | | | |
|---|---|---|---|
| 4,486,739 A * | 12/1984 | Franaszek et al. | 341/59 |
| 6,625,241 B2 * | 9/2003 | Mejia | 375/372 |
| 6,842,126 B1 * | 1/2005 | Tsai et al. | 341/102 |
| 7,031,904 B1 | 4/2006 | Wilson et al. | |
| 7,346,058 B1 * | 3/2008 | Natarajan et al. | 370/392 |
| 7,619,984 B2 * | 11/2009 | Carmichael | 370/252 |
| 2006/0168371 A1 * | 7/2006 | Chiu | 710/62 |
| 2006/0230218 A1 * | 10/2006 | Warren et al. | 710/315 |
| 2006/0242312 A1 | 10/2006 | Crespi et al. | |
| 2007/0121621 A1 | 5/2007 | Moretti et al. | |
| 2007/0223517 A1 * | 9/2007 | Warren et al. | 370/463 |
| 2007/0226419 A1 * | 9/2007 | Roy et al. | 711/118 |
| 2007/0294572 A1 * | 12/2007 | Kalwitz et al. | 714/9 |
| 2008/0126616 A1 * | 5/2008 | Kumasawa et al. | 710/42 |
| 2008/0228897 A1 * | 9/2008 | Ko | 709/213 |
| 2009/0003361 A1 * | 1/2009 | Bakthavathsalam | 370/401 |
| 2009/0168654 A1 * | 7/2009 | Mies et al. | 370/241 |
| 2009/0187924 A1 * | 7/2009 | Klein et al. | 719/326 |
| 2009/0248884 A1 * | 10/2009 | Dickens et al. | 709/230 |
| 2009/0271546 A1 * | 10/2009 | Dickens et al. | 710/60 |
| 2010/0016023 A1 * | 1/2010 | Yamauchi et al. | 455/562.1 |

OTHER PUBLICATIONS

U.S. Appl. entitled "Serial Attached SCSI and Serial ATA Wide Port Tunnelling Through a Fibre Channel Connection", Serial No. Unknown, Filing Date Mar. 25, 2008, IBM Docket No. TUC920070173US1, by inventors L.A. Dickens, T.A. Johnson, C.A. Klein, and D.J. Winarski.
"Serial Attached SCSI-1.1 (SAS 1.1)", American National Standard for Information Technology, ANSI INCITS 417-2006, Jun. 12, 2006.
"Fibre Channel-Framing and Signaling-2 (FC-FS-2)", American National Standard for Information Technology, ANSI INCITS 424-2007, Feb. 1, 2007.

* cited by examiner

*Primary Examiner* — Bunjob Jaroenchonwanit
(74) *Attorney, Agent, or Firm* — Rabindranath Dutta; Konrad Raynes & Victor LLP (57) ABSTRACT

A first special character encoded in a first protocol is transmitted across a first communications link. The transmitted first special character is received at a first interface between the first communications link and a second communications link. The first special character is converted to a second special character encoded in a second protocol, wherein the first special character is also defined for encoding in the second protocol. The second special character is transmitted across the second communications link. The second special character is received at a second interface between the second communications link and a third communications link. The second special character is converted back to the first special character. The first special character is transmitted across the third communications link.

16 Claims, 9 Drawing Sheets

DISTANCE EXTENDER FOR SERIAL ATTACHED SCSI AND SERIAL ATA

BACKGROUND

1. Field

The disclosure relates to a method, system, and article of manufacture for a distance extender for serial attached SCSI and serial ATA.

2. Background

Serial Attached SCSI (SAS) is a variation of the Small Computer System Interface (SCSI), used for connecting storage devices to a computer system. SAS has been developed as an alternative to the fiber channel interface (FC), and offers similar performance to FC at a reduced cost, at the expense of connectivity and scalability.

SAS is based on an electric technology as opposed to an optical technology as in the case of fiber channel. As a result, SAS connectivity may have a distance limitation of about 10 meters, making SAS useful inside cabinets and for peripherals that are physically located next to the computer system that uses the interface. In contrast, fiber channel may allow communications over distances exceeding a kilometer. Therefore, SAS technology may be used to connect devices at relatively shorter distances in comparison to fiber channel. The cost of using SAS technology is relatively less in comparison to using fiber channel technology.

SUMMARY OF THE PREFERRED EMBODIMENTS

Provided are a method, system, and article of manufacture wherein a first special character encoded in a first protocol is transmitted across a first communications link. The transmitted first special character is received at a first interface between the first communications link and a second communications link. The first special character is converted to a second special character encoded in a second protocol, wherein the first special character is also defined for encoding in the second protocol. The second special character is transmitted across the second communications link. The second special character is received at a second interface between the second communications link and a third communications link. The second special character is converted back to the first special character. The first special character is transmitted across the third communications link.

In additional embodiments, the first protocol is a SAS protocol, wherein the second protocol is a fiber channel protocol, wherein the first special character is a K character that is defined for encoding in both the SAS protocol and the fiber channel protocol, and the second special character is a D character defined at least for encoding in the fiber channel protocol, and wherein data communications is performed over a greater distance over the fiber channel protocol than over the SAS protocol.

In additional embodiments, conversion between K characters and D characters includes conversion of both frames and primitives, wherein an initiator and a target that communicate using the SAS protocol are able to communicate over distances that exceed a kilometer.

In further embodiments, the K character and D character pairs are taken from the paired-groups of K28.3 and D28.3, K28.5 and D28.5, and K28.6 and D28.6 in the fiber channel and SAS protocols.

In yet further embodiments the first communications link and the third communications link are both serial attached SCSI or SATA, and the second communications link is selected from a group comprising fiber channel, fiber channel over Ethernet and Ethernet.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments allow SAS technology to be used without having to sacrifice the ability to have connectivity for storage over longer distances as in fiber channel by encapsulating the SAS traffic within fiber channel frames. A tunneling mechanism is created that allows a SAS connection to span several kilometers without creating an entire fiber channel SAN. The connection appears as an ordinary SAS connection to SAS devices, but has the extended distance support of a fiber channel connection. In certain embodiments, K characters within the SAS traffic that is transmitted via fiber channel frames are preserved as D characters, so that the original traffic can be recreated at the other end of the tunnel by the conversion of D characters to K characters, wherein K characters are special characters defined in both the SAS and fiber channel protocols, and wherein D characters are defined at least in the fiber channel protocol.

Exemplary Embodiments

Figure 1:
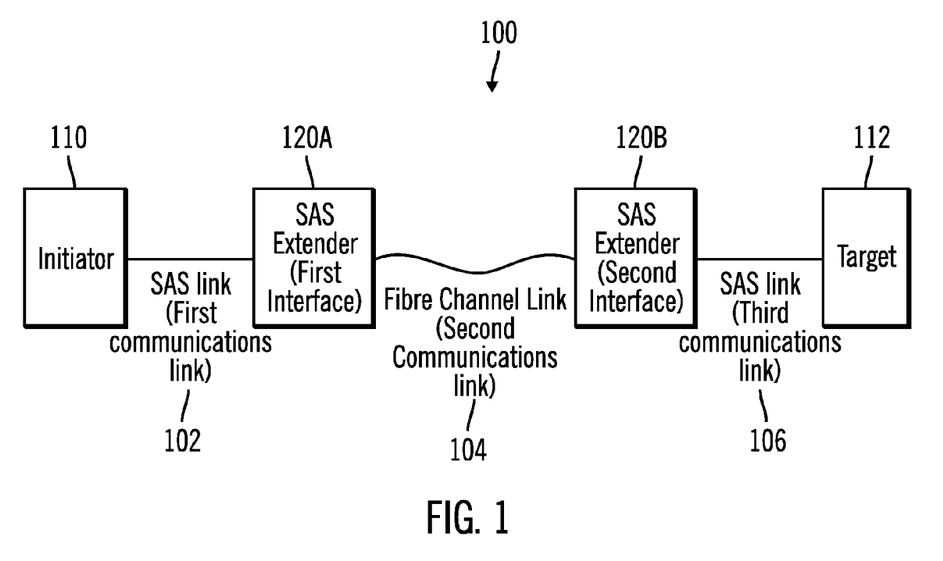
FIG. 1 illustrates a block diagram of a computing environment in which a SAS storage system is shown, in accordance with certain embodiments.

FIG. 1 illustrates a computing environment in which a SAS storage system 100 is shown. Initiator 110 is connected via SAS link 102 to a SAS Extender 120A, wherein the SAS extender 120A is connected to SAS Extender 120B via a fiber channel link 104, and wherein the SAS extender 120B is in turn connected to target 112 via a SAS link 106. The fiber channel link 104 may physically be one or more kilometers long, allowing data from initiator 110 to be stored remotely on target 112. Initiator 110 and target 112 operate as if the fiber channel link 104 and the SAS extenders 120A and 120B are not in the connection, and the link is purely a SAS link.

In certain embodiments, the fiber channel link 104 may be hundreds of kilometers long, whereas the SAS link 102 and the SAS link 106 may be limited to 10 meters in length. In alternative embodiments, SAS link 102 and SAS link 106 may be implemented via serial attached advanced technology attachment (SATA). Fiber channel link 104 may be implemented via Ethernet or fiber-channel-over-Ethernet. The initiator 110, the target 112, and the SAS extenders 120A, 120B may comprise any suitable device including those presently known in the art, such as, a personal computer, a workstation, a server, a mainframe, a hand held computer, a palm top computer, a telephony device, a network appliance, a blade computer, a storage server, etc.

In certain embodiments the initiator 110 may transmit SAS frames or primitives over the SAS link 102. The SAS extender 120A converts K characters in the SAS frames or primitives to D characters for transmission across the fiber channel link 104 and the modified SAS frames or primitives are encapsulated within a fiber channel frame. The SAS extender 120B receives the fiber channel frame and converts D-characters back to K-characters to generate a SAS frame or primitive to transmit to the target 112 over the SAS link 106. As a result, the initiator 110 and target 112 which both use the SAS protocol for communications can communicate over long distances (such as over a kilometer) by using the SAS extenders 120A, 120B that are coupled via the fiber channel link 104. It should be noted that K characters may also be used in the fiber channel protocol, and by using D characters instead of the K characters of the SAS protocol, a SAS frame or primitive is encapsulated within a fiber channel frame.

Figure 2:
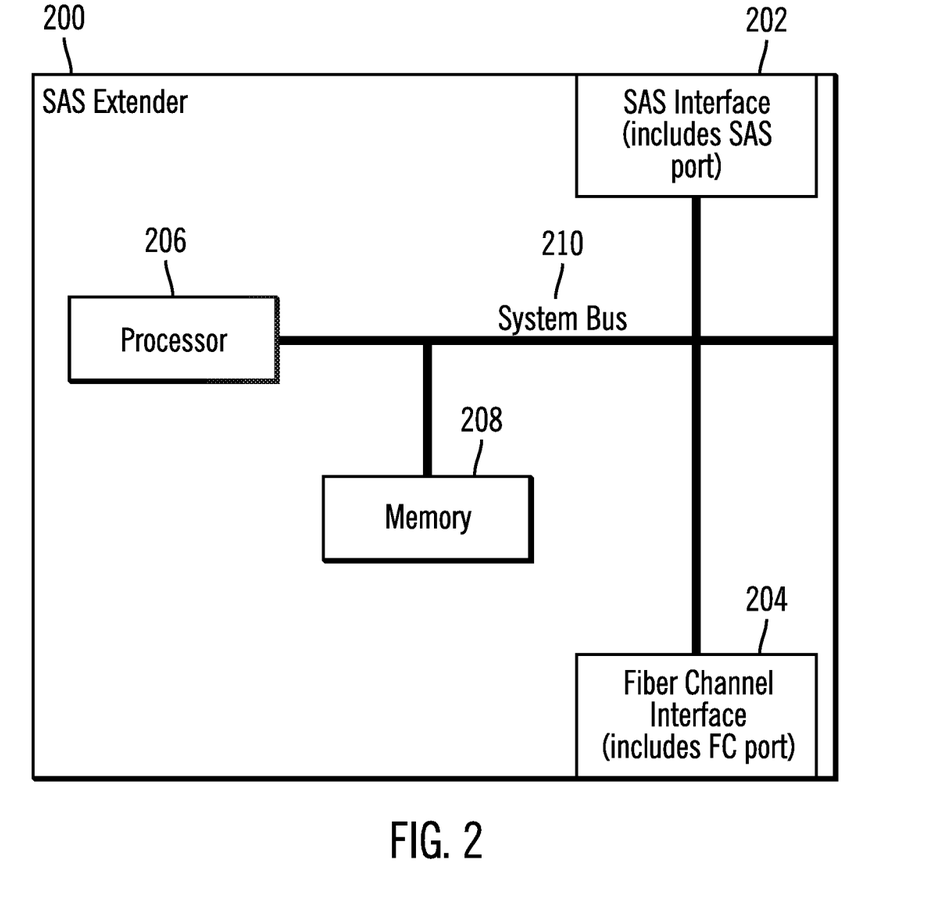
FIG. 2 shows a block diagram of a SAS extender in accordance with certain embodiments.

FIG. 2 shows a block diagram of an exemplary SAS extender 200 in accordance with certain embodiments. The exemplary SAS extender 200 is a schematic representation of the SAS extender 120A and the SAS extender 120B of FIG. 1. The SAS extender 200 is comprised of a processor 206, a memory 208, a fiber channel interface 204, and a SAS interface 202. The processor 206, the memory 208, the fiber channel interface 204 and the SAS interface 202 communicate via a system bus 210. The memory 208 may be comprised of a flash memory, a hard disk, an optical storage, a solid-state memory, or any other type of storage medium or a combination of memory types. The processor 206 controls the operation of the device via machine readable code stored within the memory 208. The SAS interface 202 and the fiber channel interface 204 may be comprised of one or more chipsets. The SAS interface 202 may include at least one SAS port and the fiber channel interface 204 may include at least a fiber channel port.

Figure 3:
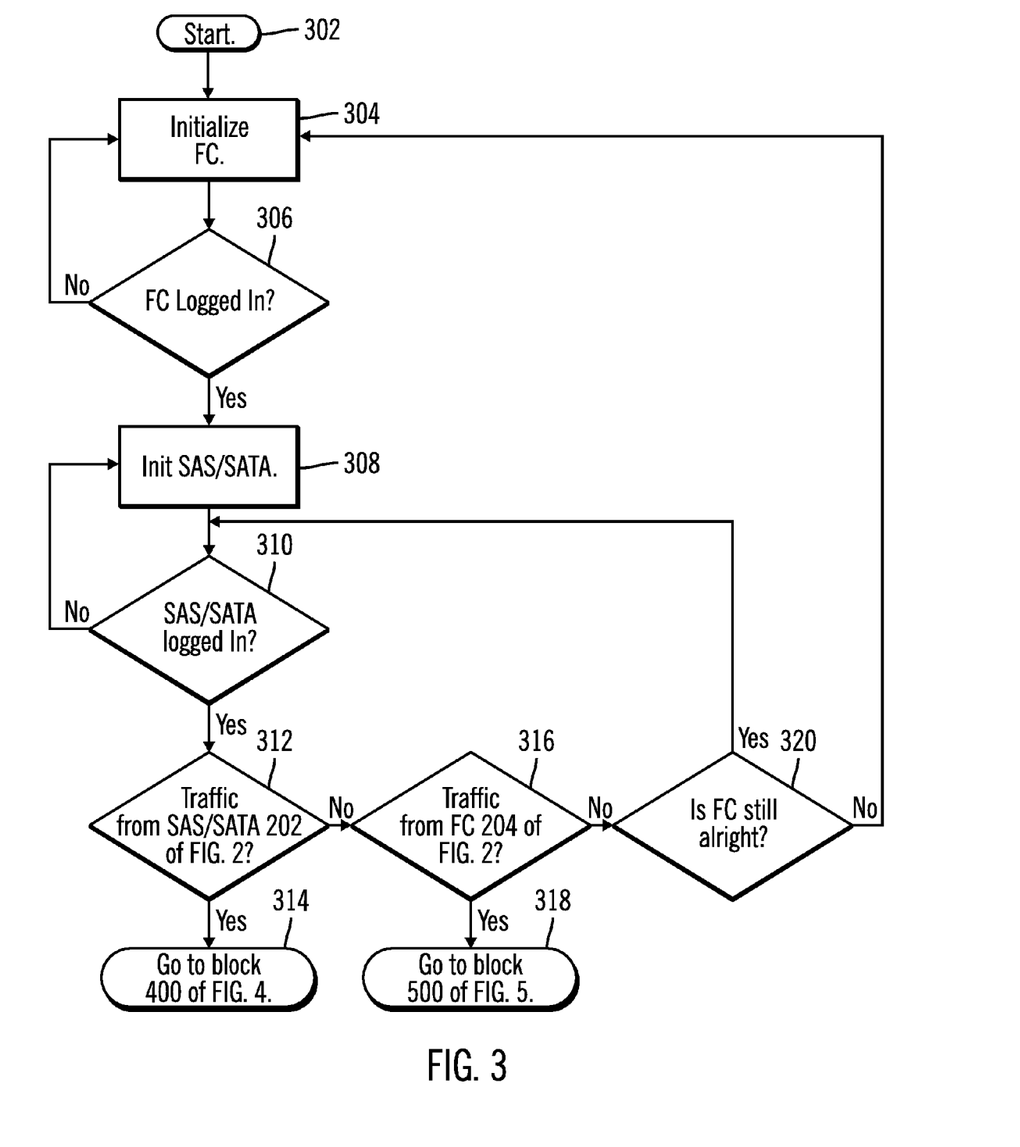
FIG. 3 illustrates operations performed by a SAS extender, in accordance with certain embodiments.

FIG. 3 illustrates operations performed by a SAS Extender processor, such as the processor 206 included in the SAS extender 200, wherein the SAS extender 200 is a representation of the SAS extenders 120A, 120B.

Control starts at 302, and proceeds to block 304, where a fiber channel link associated with the fiber channel interface 204 is initialized. The initialization of the fiber channel link includes speed negotiation, port login, process login, etc. In certain embodiments, a class 2 login is preferred, wherein a class 2 login is a type of login that is acknowledged. However, in alternate embodiments another class of service, such as class 3, may be used.

Control proceeds to block 306, where a determination is made as to whether the fiber channel login was successful and whether the fiber channel link 104 is operational. If not, control returns to block 304 and the initialization sequence is repeated. If at block 306 the fiber channel login is successful then control proceeds to block 308 where the SAS link connected to the SAS interface 202 is similarly initialized. The SAS link is checked (at block 310) to verify that the SAS initialization was successful and to verify that the SAS port 202 is logged in. If the initialization was not successful, control returns to block 308, where the SAS initialization process is repeated.

If at block 310 the SAS initialization was successful ("Yes" branch from block 310), then control proceeds to block 312, where a check is made for any incoming traffic from the SAS port 202. If there is traffic from the SAS port 202 ("Yes" branch from block 312), control proceeds to block 314, wherein at block 314 control proceeds to block 400 of FIG. 4 to be described later.

If at block 312, there is no traffic from SAS port 202 ("No" branch from block 312), control proceeds to block 316, where a check is made for traffic from the fiber channel port 204. If there is incoming traffic from the fiber channel port 204 ("Yes" branch from block 316), then control proceeds to block 318, wherein at block 318 control proceeds to block 500 of FIG. 5 to be described later.

If at block 316 there is no incoming traffic from fiber channel port 204 ("No" branch of block 316), control proceeds to block 320, where the fiber channel port 204 is checked for errors. If fiber channel port 204 is no longer logged in ("No" branch from block 320), control returns to block 304, where the fiber channel port 204 is initialized as before. If at block 320, fiber channel port 204 is still logged in ("Yes" branch from block 320), then control returns to block 310, where the SAS port 202 is checked as before.

Figure 4:
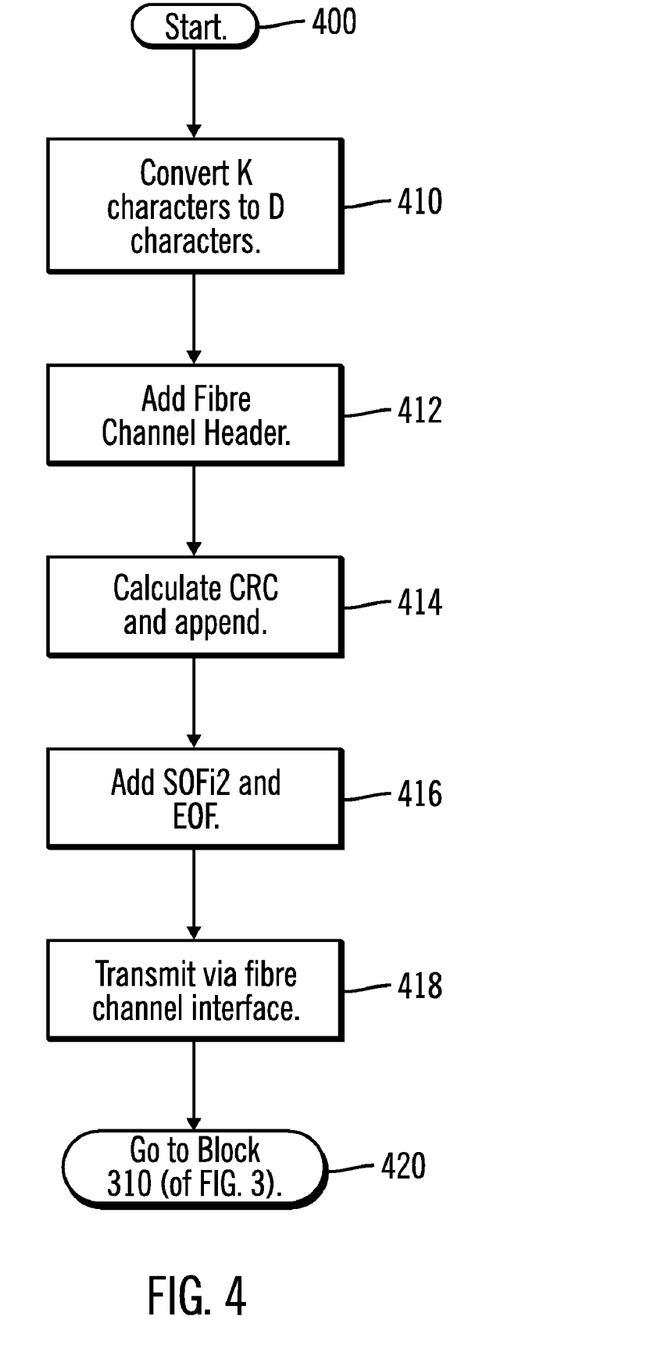
FIG. 4 illustrates operations that are performed when incoming traffic from a SAS port is detected, in accordance with certain embodiments.

FIG. 4 illustrates operations that are performed when incoming traffic from SAS port 202 is detected. The incoming traffic may be a primitive, a special sequence, or a SAS or SATA frame. Out of Band (OOB) data is not included, as OOB data may be handled by the SAS chipset and may not visible to the processor 206.

Control begins at block 400 and proceeds to block 410. At block 410, any K characters are converted to the corresponding D characters to preserve the identity of the K characters, wherein the phase-locked-loop in the fiber channel port 204 on the receiving end of fiber channel link 104 (of FIG. 1) is prevented from detecting the characters as a comma character. Control then proceeds to block 412, where a fiber channel header is added to the beginning of the SAS traffic fragment. The header may indicate in the R_CTL field that the information category for the frame is "Uncategorized Information". From block 412 control proceeds to block 414, where cyclic redundancy check (CRC) for the newly created fiber channel frame is calculated and appended to the end of the frame (EOF). At block 416, a start of frame is added to the front of the frame, preferably a SOFi2, and an end of frame is appended to the end of the frame. At block 418, the frame is queued for transmission on the fiber channel interface port 204. If the fiber channel port 204 is logged in as a class 2 connection then block 418 verifies that the frame that is sent is also acknowledged by the receiving port. If the frame is not acknowledged, then the fiber channel interface may proceed into error recovery (not shown). Finally, control proceeds to block 420, where it returns to block 310 of FIG. 3. In alternative embodiments where Ethernet is used instead of fiber channel, K characters in SAS/SATA transmission are also converted to D characters.

Figure 5:
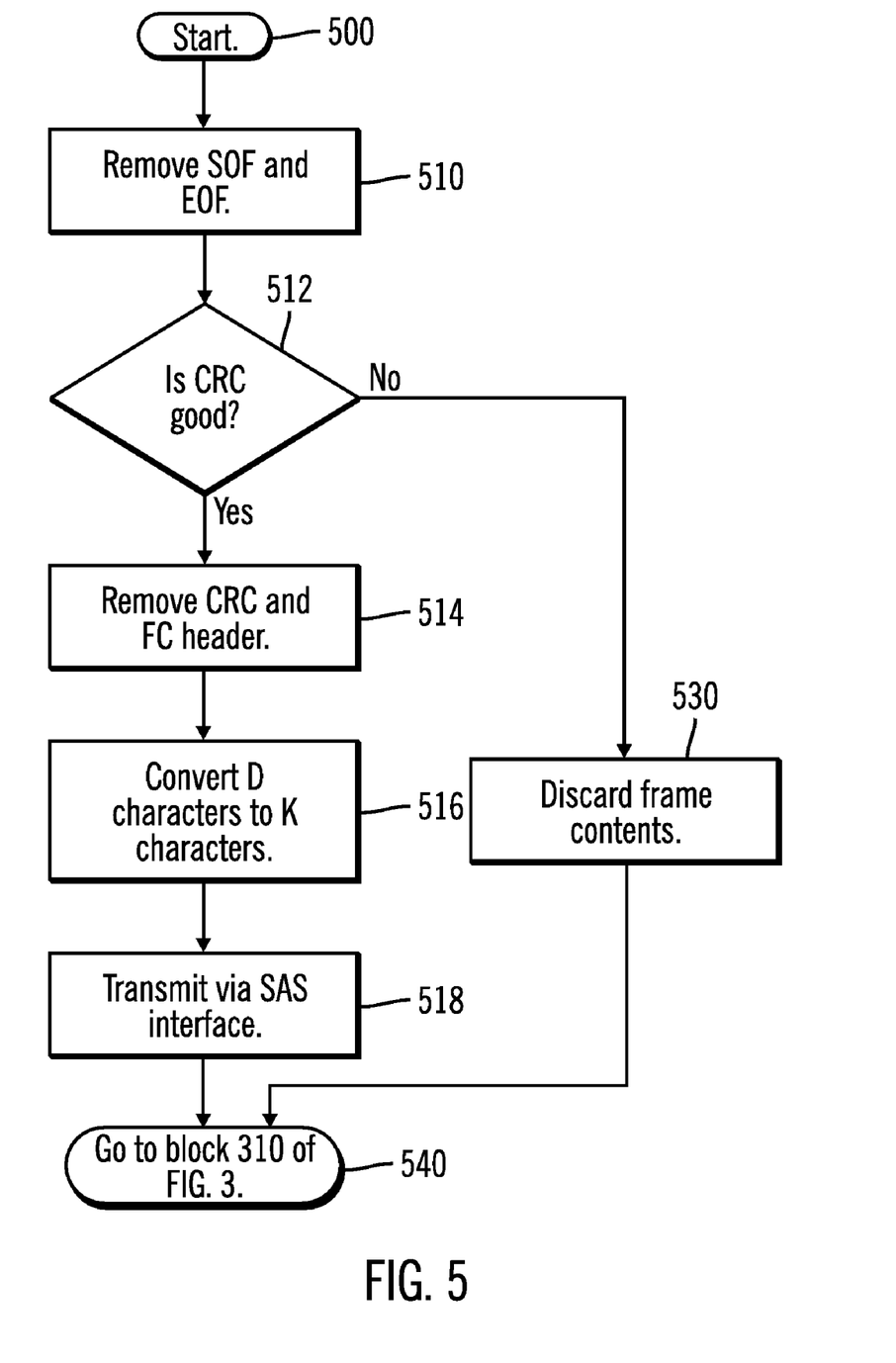
FIG. 5 illustrates operations that are performed when incoming traffic from a fiber channel port is detected, in accordance with certain embodiments.

FIG. 5 illustrates operations performed when incoming traffic from the fiber channel interface 204 is detected by the processor 206.

Control starts at block 500 and proceeds to block 510 where the start-of-frame and end-of-frame (SOF and EOF) are removed from the traffic unit, wherein the traffic unit may be a primitive, a special sequence, or a SAS/SATA frame. Control then proceeds to block 512, where the CRC for the frame contents is calculated and compared to the CRC at the end of the frame. If at block 512 the CRC does not compare successfully ("No" branch from block 512), then the frame is discarded in block 530, and control proceeds to block 540, where control returns to block 310 of FIG. 3.

If at block 512, the calculated CRC matches the CRC in the frame ("Yes" branch from block 512), control proceeds to block 514, where the CRC and the fiber channel header are removed from the traffic segment. In block 516, the first character in the remaining traffic segment is converted from a D character to its corresponding K character. Furthermore, if the traffic segment is longer than 4 characters, then the fourth from the last character is also converted from a data character to the corresponding K character. The traffic segment is then queued (at block 518) for transmission on the SAS interface port 202. Control then moves to block 540, where control returns to block 310 of FIG. 3.

Figure 6:
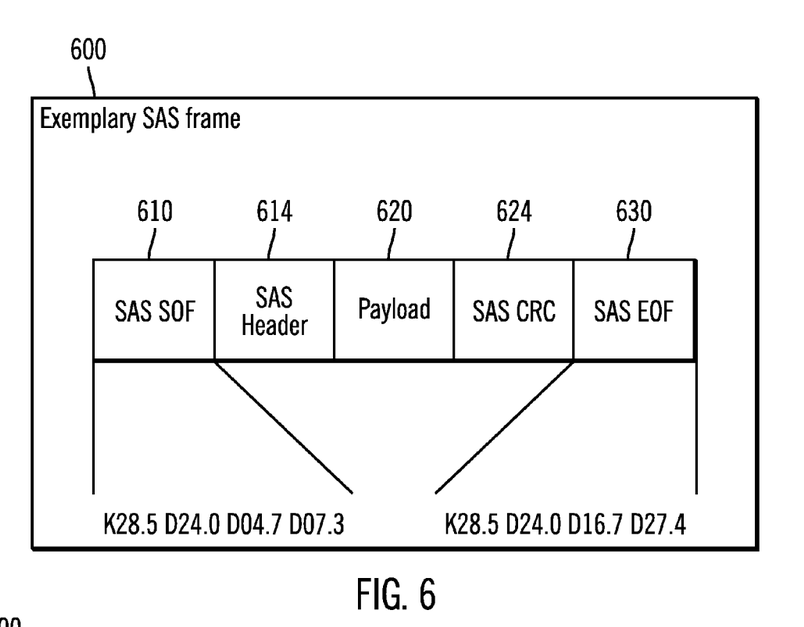
FIG. 6 illustrates a block diagram of an exemplary SAS frame that may be received by a SAS port, in accordance with certain embodiments.

FIG. 6 is a block diagram of an exemplary SAS frame 600 that may be received by the SAS port 202. The exemplary SAS frame 600 is comprised of a Start-of-Frame (SOF) 610, which is four characters long and is a "K28.5, D24.0, D04.7, D07.3". Following the Start-of-Frame 610 is the SAS Header 614, the SAS payload 620, and the SAS CRC 624. At the end of the SAS frame is an End-of-Frame (EOF) 630, comprising of K28.5, D24.0, D16.7, D27.4.

Figure 7:
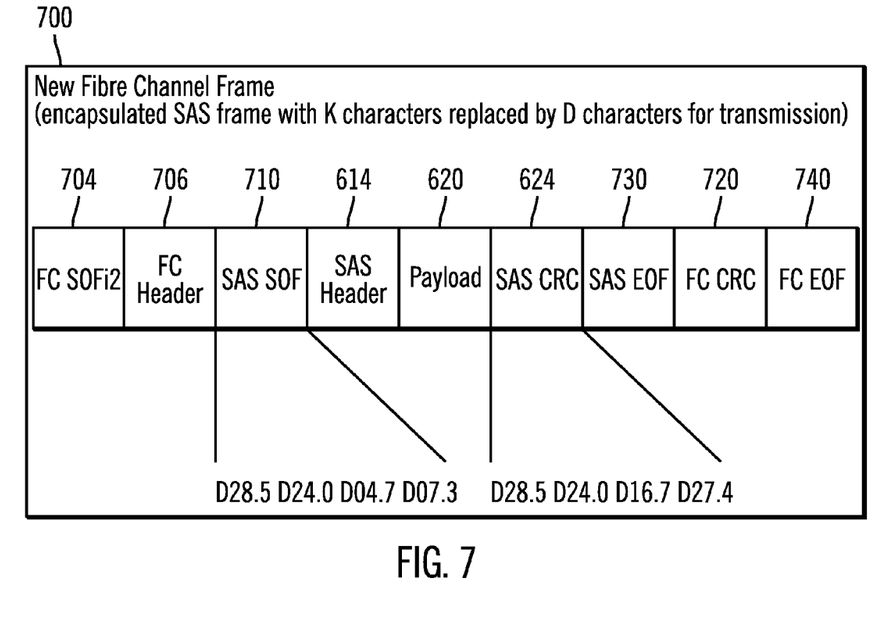
FIG. 7 illustrates a block diagram that shows a newly created fiber channel frame, wherein the newly created fiber channel frame is generated from an exemplary SAS frame, in accordance with certain embodiments.

FIG. 7 is a block diagram that shows a newly created fiber channel frame 700, wherein the newly created fiber channel frame 700 is generated from the exemplary SAS frame 600 after encapsulation. The new fiber channel frame 700 that is created begins with a fiber channel Start-of-Frame SOFi2 704 and is followed by the fiber channel header 706. Next in the fiber channel frame 700 is the encoded SAS Start-of-Frame SOF 710, which is the SAS Start-of-Frame SOF 610 (of FIG. 6) after converting the K character K28.5 to the corresponding D character D28.5. Following this are the SAS Header 614, the Payload 620 from the SAS frame 600, the SAS CRC 624, and the SAS End-of-Frame EOF 730 which is the encoded SAS EOF 630, after converting the K28.5 character to a D28.5 character. Next is the fiber channel CRC 720, calculated from the FC header 706 to the SAS EOF 730 and all bytes in between. At the end of the fiber channel frame 700 is the fiber channel End-of-Frame 740.

Figure 8:
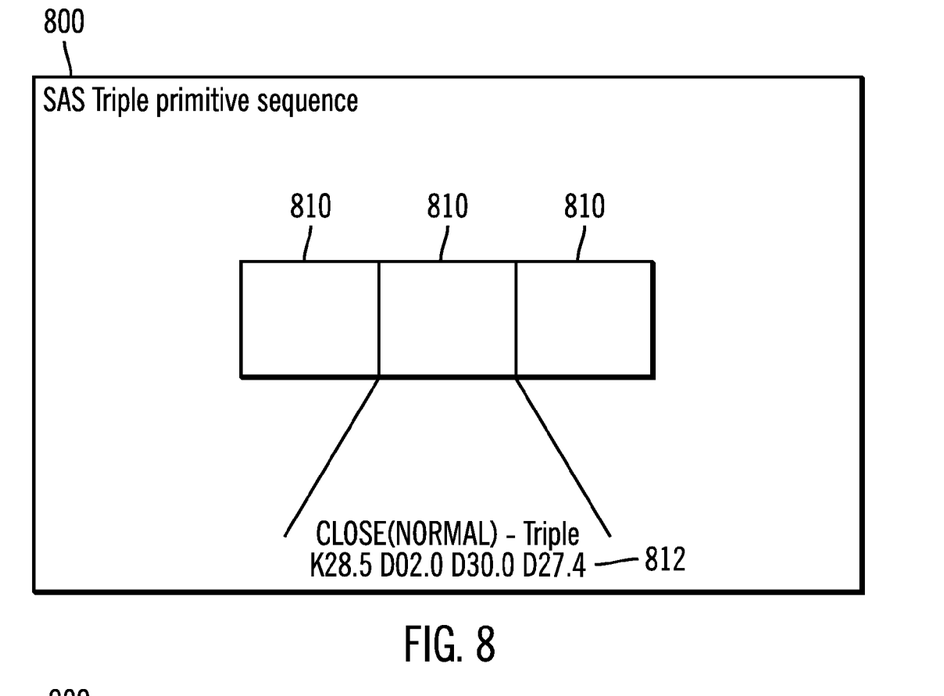
FIG. 8 illustrates a block diagram of an exemplary triple primitive sequence of SAS, in accordance with certain embodiments.

FIG. 8 shows a block diagram of an exemplary triple primitive sequence 800 of SAS, comprising of three consecutive Close (Normal) 810 which are K28.5, D02.0, D30.0, D27.4 (reference numeral 812). It requires three consecutive primitives 810 in order to be detected at the receiver. Another triple primitive sequence of the same type may not be detected without three consecutive non-deletable primitives in between.

Figure 9:
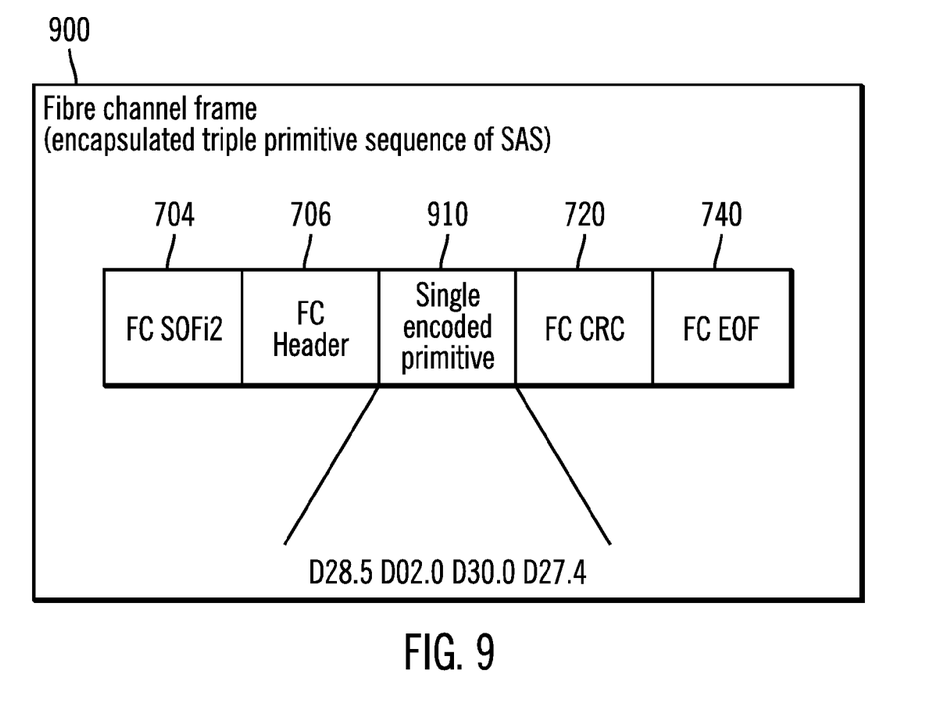
FIG. 9 illustrates a block diagram of a new fiber channel frame that includes an encapsulated version of a triple primitive sequence of SAS, in accordance with certain embodiments.

FIG. 9 shows a block diagram of a new fiber channel frame 900 that includes an encapsulated version of the triple primitive sequence 800 (of FIG. 8) of SAS, where a single occurrence of the encoded primitive 910 is encapsulated within the fiber channel frame 900. The triple primitive sequence 810, wherein each primitive comprises K28.5 D02.0 D30.0 D27.4 is replaced by a single encode primitive 910 comprising D28.5 D02.0 D30.0 D27.4 in the fiber channel frame 900. Thus the replacement of K characters in SAS triple primitive sequences by D characters in fiber channel frames is shown in FIG. 9. When the SAS trip primitive sequence 800 of FIG. 8 is received by the SAS port 202, the fiber channel frame 900 is transmitted on the fiber channel port 204 by processor 206. Additionally, when the fiber channel frame 900 in FIG. 9 is received by the fiber channel port 204, the triple primitive sequence 800 of FIG. 8 is transmitted on the SAS port 202 by processor 206.

Redundant primitive sequences are treated similarly, with the exception that the redundant primitive sequence is detected after three consecutive primitives by the SAS port 202, but when the fiber channel port 204 receives the encapsulated frame of FIG. 9 the fiber channel protocol 204 will generate six of the redundant primitives. Single primitives are encoded as they are received, on a one-to-one basis.

Figure 10:
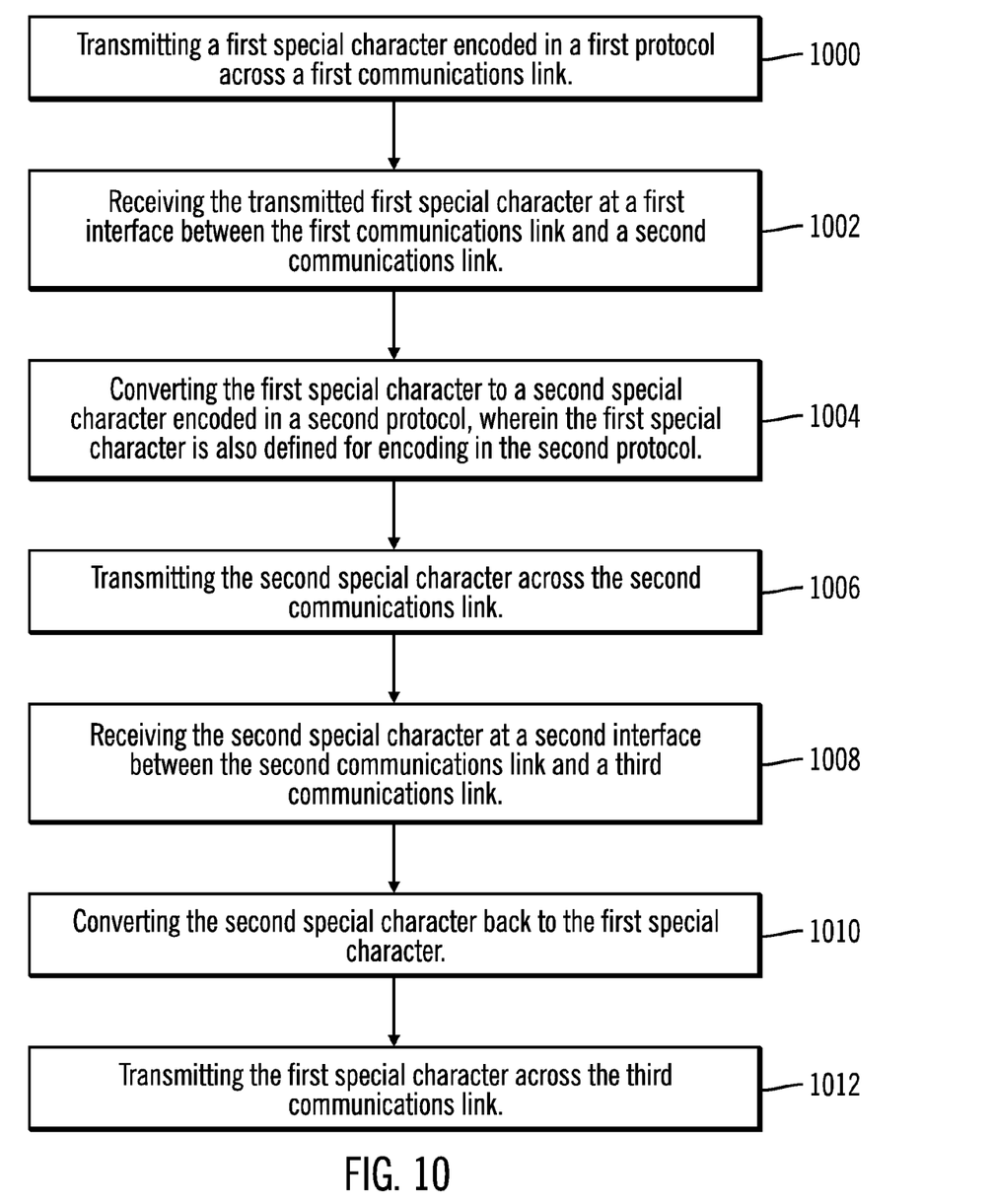
FIG. 10 illustrates operations that may be performed in accordance with certain embodiments.

FIG. 10 illustrates operations that may be performed in accordance with certain embodiments.

Control starts at block 1000, where a first special character (e.g., a K character) encoded in a first protocol (e.g., SAS protocol) is transmitted across a first communications link 102 (e.g., a SAS link).

The transmitted first special character is received (at block 1002) at a first interface 120A (e.g., a SAS extender) between the first communications link 102 and a second communications link 104 (e.g., a fiber channel link).

The first special character is converted (at block 1004) to a second special character encoded in a second protocol, wherein the first special character is also defined for encoding in the second protocol (i.e., the K character is defined and permitted to be used in both the SAS and the fiber channel protocol). The conversion may take place in the first interface 120A.

Control proceeds to block 1006, where the first interface 120A may transmit the second special character across the second communications link 104. For example, the SAS extender 120A may transmit the D-character across the fiber channel link 104.

The second special character is received (at block 1008) at a second interface 120B (e.g., a SAS extender) between the second communications link 104 and a third communications link 106 (e.g., a SAS link). For example, in certain embodiments the SAS extender 120B receives D characters transmitted across the fiber channel link 104.

Control proceeds to block 1010, where the second interface 120B converts the second special character back to the first special character. The second interface 120B then transmits (at block 1012) the first special character across the third communications link.

Therefore, in certain embodiments an initiator 110 may transmit SAS frames or primitives over the SAS link 102. The SAS extender 120A converts K-characters in the SAS frames or primitives to D-characters for transmission across the fiber channel link 104 and the modified SAS frames or primitives are encapsulated within a fiber channel frame. The SAS extender 120B receives the fiber channel frame and converts D-characters back to K-characters to generate a SAS frame or primitive to transmit to the target 112 over the SAS link 106. As a result, the initiator 110 and target 112 which both use the SAS protocol for communications can communicate over long distances (such as over a kilometer) by using the SAS extenders 120A, 120B that are coupled via the fiber channel link 104.

Certain embodiments allow the transporting of SAS or SATA sequences over either fiber channel or Ethernet. In certain embodiments K-character types are preserved via a simple translation to D characters. In alternative embodiments a mapping scheme may be used to preserve the K character types. While embodiments have shown a simple mapping of K to D characters, other embodiments may utilize different mappings. Certain embodiments may use the unspecified routing and info category in the R_CTL (Routing Control) in the fiber channel Header (R_CTL=00). A frame forwarding methodology is used and primitives may be encapsulated within a fiber channel or an Ethernet frame.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 11:
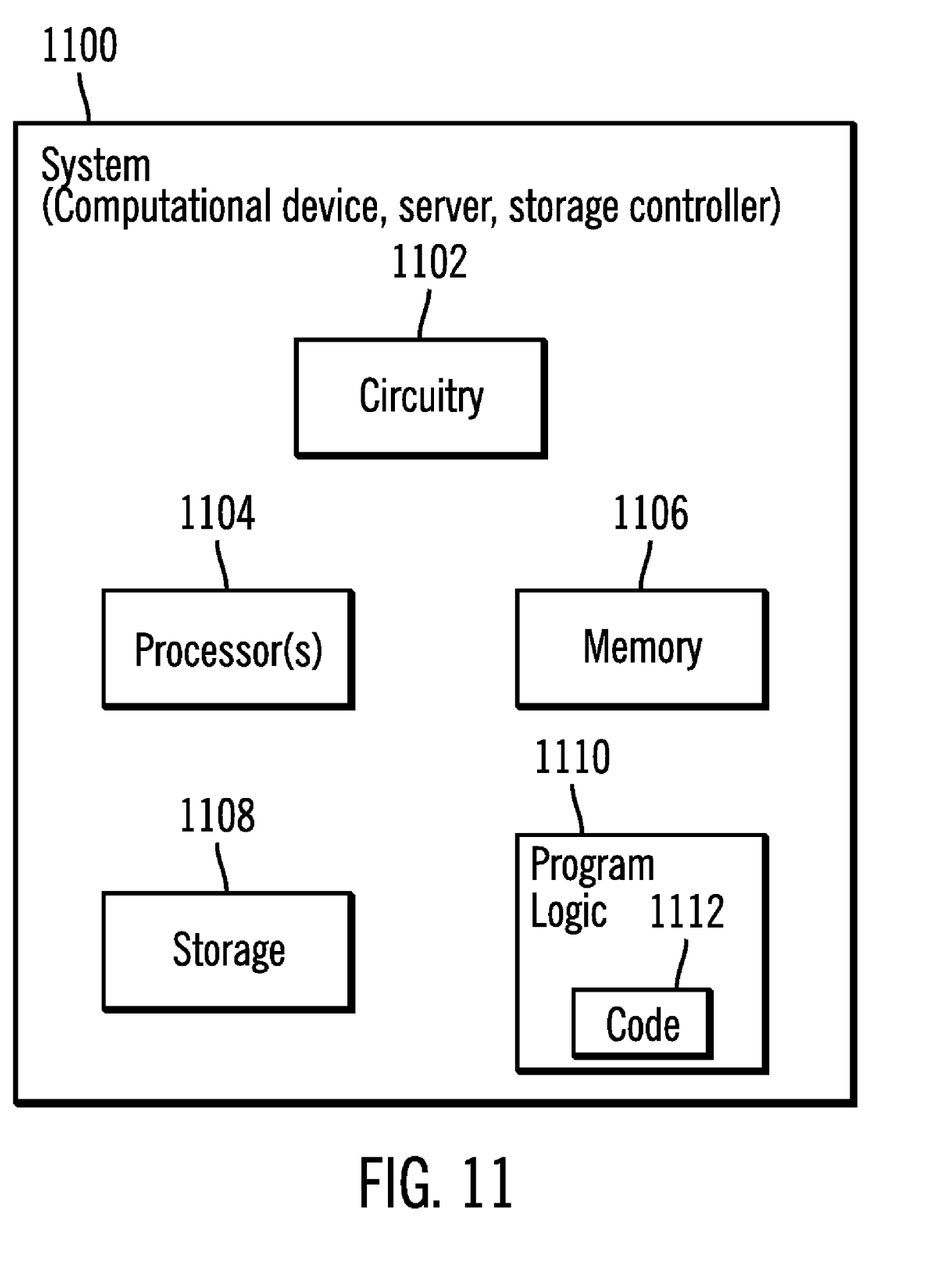
FIG. 11 illustrates a block diagram that shows certain elements that may be included in the initiators, targets, and SAS extenders in the computing environment of FIG. 1, in accordance with certain embodiments.

FIG. 11 illustrates a block diagram that shows certain elements that may be included in the initiator 110, target 112, and SAS extenders 120A, 120B in accordance with certain embodiments. One or more of the initiator 110, target 112, and SAS extenders 120A, 120B either individually or collectively may also be referred to as a system 1100, and may include a circuitry 1102 that may in certain embodiments include a processor 1104. The system 1100 may also include a memory 1106 (e.g., a volatile memory device), and storage 1108. The storage 1108 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-11 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-11 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   transmitting a K character encoded in a small computer system interface (SAS) protocol across a first communications link;
   receiving the transmitted K character at a first interface between the first communications link and a second communications link;
   converting, by a processor, the K character encoded in the SAS protocol to a D character encoded in a fiber channel protocol, wherein the K character is also defined for encoding in the fiber channel protocol;
   adding a fiber channel header to the beginning of a SAS traffic segment to create a fiber channel frame, wherein the fiber channel header indicates uncategorized information category in a R_CTL field;
   subsequent to adding the fiber channel header, transmitting the D character across the second communications link;
   receiving the D character at a second interface between the second communications link and a third communications link;
   converting the D character back to the K character; and
   transmitting the K character across the third communications link in the SAS protocol.

2. The method of claim 1, wherein data communications is performed over a greater distance over the fiber channel protocol than over the SAS protocol.

3. The method of claim 2, wherein conversion between K characters and D characters includes conversion of both frames and primitives, and wherein an initiator and a target that communicate using the SAS protocol are able to communicate over distances that exceed a kilometer.

4. The method of claim 2, wherein the K character and D character pairs are taken from the paired-groups of K28.3 and D28.3, K28.5 and D28.5, and K28.6 and D28.6 in the fiber channel and SAS protocols.

5. A system, comprising:
   a memory; and
   a processor coupled to the memory, wherein the processor performs operations, the operations comprising:
   transmitting a K character encoded in a small computer system interface (SAS) protocol across a first communications link;
   receiving the transmitted K character at a first interface between the first communications link and a second communications link;
   converting the K character encoded in the SAS protocol to a D character encoded in a fiber channel protocol, wherein the K character is also defined for encoding in the fiber channel protocol;
   adding a fiber channel header to the beginning of a SAS traffic segment to create a fiber channel frame, wherein the fiber channel header indicates uncategorized information category in a R_CTL field;
   subsequent to adding the fiber channel header, transmitting the D character across the second communications link;
   receiving the D character at a second interface between the second communications link and a third communications link;
   converting the D character back to the K character; and
   transmitting the K character across the third communications link in the SAS protocol.

6. The system of claim 5, wherein data communications is performed over a greater distance over the fiber channel protocol than over the SAS protocol.

7. The system of claim 6, wherein conversion between K characters and D characters includes conversion of both frames and primitives, and wherein an initiator and a target that communicate using the SAS protocol are able to communicate over distances that exceed a kilometer.

8. The system of claim 6, wherein the K character and D character pairs are taken from the paired-groups of K28.3 and D28.3, K28.5 and D28.5, and K28.6 and D28.6 in the fiber channel and SAS protocols.

9. An article of manufacture comprising hardware or a combination of hardware and software including code, wherein the code when executed on a processor performs operations, the operations comprising:
   transmitting a K character encoded in a small computer system interface (SAS) protocol across a first communications link;
   receiving the transmitted K character at a first interface between the first communications link and a second communications link;
   converting the K character encoded in the SAS protocol to a D character encoded in a fiber channel protocol, wherein the K character is also defined for encoding in the fiber channel protocol;
   adding a fiber channel header to the beginning of a SAS traffic segment to create a fiber channel frame, wherein the fiber channel header indicates uncategorized information category in a R_CTL field;
   subsequent to adding the fiber channel header, transmitting the D character across the second communications link;

receiving the D character at a second interface between the second communications link and a third communications link;

converting the D character back to the K character; and transmitting the K character across the third communications link in the SAS protocol.

10. The article of manufacture of claim 9, wherein data communications is performed over a greater distance over the fiber channel protocol than over the SAS protocol.

11. The article of manufacture of claim 10, wherein conversion between K characters and D characters includes conversion of both frames and primitives, and wherein an initiator and a target that communicate using the SAS protocol are able to communicate over distances that exceed a kilometer.

12. The article of manufacture of claim 10, wherein the K character and D character pairs are taken from the paired-groups of K28.3 and D28.3, K28.5 and D28.5, and K28.6 and D28.6 in the fiber channel and SAS protocols.

13. A method for deploying computing infrastructure, comprising integrating machine-readable code into a machine, wherein the code in combination with the machine is capable of performing:

transmitting a K character encoded in a small computer system interface (SAS) protocol across a first communications link;

receiving the transmitted K character at a first interface between the first communications link and a second communications link;

converting, by a processor, the K character encoded in the SAS protocol to a D character encoded in a fiber channel protocol, wherein the K character is also defined for encoding in the fiber channel protocol;

adding a fiber channel header to the beginning of a SAS traffic segment to create a fiber channel frame, wherein the fiber channel header indicates uncategorized information category in a R_CTL field;

subsequent to adding the fiber channel header, transmitting the D character across the second communications link;

receiving the D character at a second interface between the second communications link and a third communications link;

converting the D character back to the K character; and transmitting the K character across the third communications link in the SAS protocol.

14. The method for deploying computing infrastructure of claim 13, wherein data communications is performed over a greater distance over the fiber channel protocol than over the SAS protocol.

15. The method for deploying computing infrastructure of claim 14, wherein conversion between K characters and D characters includes conversion of both frames and primitives, and wherein an initiator and a target that communicate using the SAS protocol are able to communicate over distances that exceed a kilometer.

16. The method for deploying computing infrastructure of claim 14, wherein the K character and D character pairs are taken from the paired-groups of K28.3 and D28.3, K28.5 and D28.5, and K28.6 and D28.6 in the fiber channel and SAS protocols.

* * * * *